United States Patent

[11] 3,584,908

| [72] | Inventor | Frank Ray<br>19497 Mark Twain, Detroit, Mich. 48235 |
|---|---|---|
| [21] | Appl. No. | 788,591 |
| [22] | Filed | Jan. 2, 1969 |
| [45] | Patented | June 15, 1971 |

[54] CONTACT LENS HOLDER
3 Claims, 9 Drawing Figs.

[52] U.S. Cl. .................................................. 294/1
[51] Int. Cl. ........................................... G02c 11/00
[50] Field of Search ........................................... 294/64, 1
CA; 273/106.5 A

[56] References Cited
UNITED STATES PATENTS

| 1,918,718 | 7/1933 | Samsel | 273/106.5 A |
| 2,379,629 | 7/1945 | Eweson | 294/1 (CA) |
| 2,384,334 | 9/1945 | Olson | 294/64 |
| 2,919,696 | 1/1960 | Rinaldy | 294/64 |
| 3,129,971 | 4/1964 | Kobler | 294/64 |
| 3,139,298 | 6/1964 | Grabiel | 294/1 (CA) |
| 3,304,113 | 2/1967 | Hutchison | 294/64 |

*Primary Examiner*—Harvey C. Hornsby
*Assistant Examiner*—Merle F. Maffel
*Attorney*—Cullen, Settle, Sloman & Cantor

ABSTRACT: A contact lens holder which includes a tubular shaft and a slightly concaved adhesion disc at one or both ends thereof and including a tubular shank snugly nested and secured within said shaft, together with a flexible double-adhesive disc which may be selectively mounted within the adhesion disc for increased holding power.

PATENTED JUN 15 1971 3,584,908
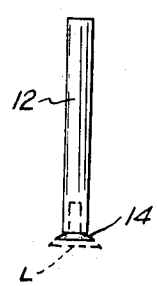
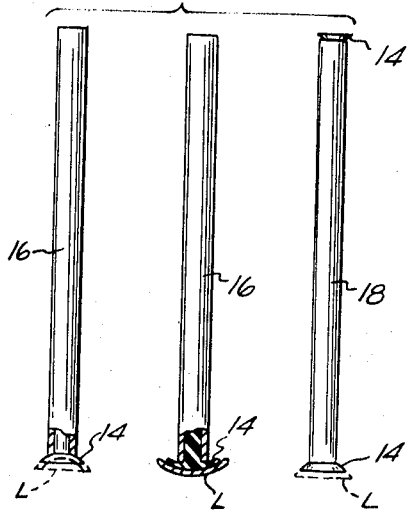
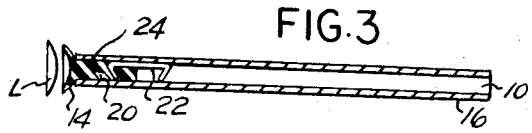
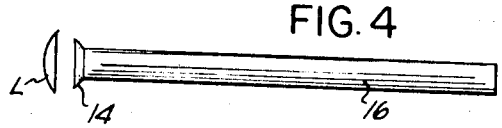
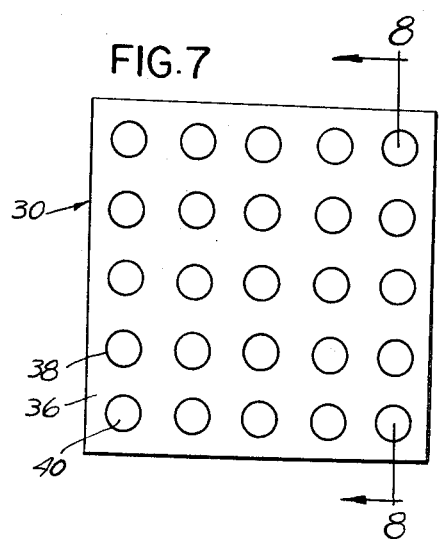
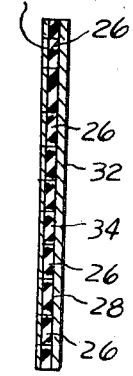
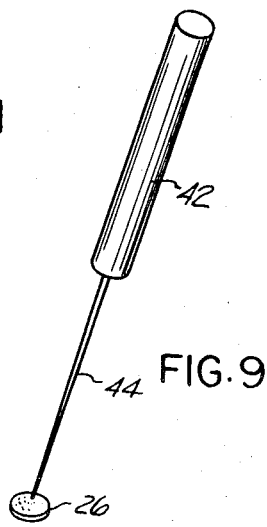
INVENTOR
FRANK RAY
BY Cullen, Sloman, & Paxton
ATTORNEYS

CONTACT LENS HOLDER

BRIEF DESCRIPTION

When contact lenses covered the whole front part of the eye the adjustments on these large lenses where fairly easy. Around 1950, the cornea lenses proved to be more practical and became increasingly popular. The first cornea lenses were as large as the cornea; about 12 mm., but long years of experience in the fitting of cornea lenses proved that a much smaller lens than the cornea has less ill effects. Slowly, the size of the lenses shrank to 8—9.5 mm.

It became increasingly difficult to adjust these tiny fragile lenses. It is not possible to hold the lenses with hands, so the nearest idea was the suction rod. This generally known and used device is a leftover from the sclera lens times. It is a rubber suction cup, with an elongated, hollow handle. First you squeeze the air out, then you touch the lens which will stick to the suction cup part for a short time. On convex surface it works better, however, the holding time is very short, but applying it on the concave side the holding time is shorter.

With a gradual size reduction of contact lenses or cornea lenses, the handling and the holding of said lenses for the purpose of adjusting or for modification or for polishing becomes more and more difficult. Therefore, the primary problem is to hold the lens safely and securely and properly during these adjustments.

It is therefore an object of the present invention to provide an improved contact lens holder which mounts upon a tubular shaft, a tiny unit adhesion disc, together with means for fixedly securing said disc in position, said disc being constructed of a flexible material, such as rubber, and which preferably with the slight application of a small amount of sealing moisture, when applied to a contact lens on either of its surfaces is adapted to hold it firmly and effectively for a long period of time and during a machining or adjusting or polishing or any other function including, but not exclusive of, removing a contact lens from the cornea.

It is an object of the present holder to eliminate the squeezing of the conventional type of holder wherein only a slight touch and the lens is already attached to this effective holding tool and may be engaged on either the concave or the convex side for the purpose of making optical changes, such as more plus or more minus, remove a mucous deposit or other substance from the surface of the lens or for polishing surface scratches, or changing size and bevel, or to otherwise modify the lens construction.

Heretofore, other means have been employed for securing and holding contact lenses such as hand cut irregularly shaped double-adhesive tape placed on a hard surface with the possible distortion to the lens and the difficulty that very often the lens becomes disconnected, such as during buffing or other machining or adjustment of the lens.

It is another object to provide an auxiliary and selectively adaptable double-adhesive disc which when applied within the adhesion disc provides for increased holding power.

The present invention also contemplates a convenient storage holder for the double-adhesive disc.

These and other objects will be seen from the following specification and claims in conjunction with the appended drawings in which:

FIG. 1 is a front elevational view of one from of the present contact lens holder with connected contact lens shown in dotted lines.

FIG. 2 is an elevational view of the three slightly different forms of the present lens holder either with different sized discs or with discs at both ends.

FIG. 3 is an exploded view in longitudinal section of one of the holders of FIG. 2 showing the relation between the lens and the adhesion disc.

FIG. 4 is a side elevational view of a holder in exploded relation to the concave side of a contact lens.

FIG. 5 is a similar view of a modification in exploded view illustrating the use of an adapter with double-adhesive disc for increased holding pressure.

FIG. 6 is a plan view of an adapter disc.

FIG. 7 is a plan view of the double-tape disc holding and storage device.

FIG. 8 is a section taken in the direction of arrows 8–8 of FIG. 7.

FIG. 9 illustrates a paper and double-tape disc lifting tool.

Referring to the drawing, one form of the present invention in FIG. 1 shows a contact lens holder which includes the shaft 12, of aluminum for illustration, including a bore at least adjacent one end adapted to receive the mounting shank of the soft rubber or other flexible adhesion disc 14.

A contact lens is shown in dotted lines with its convex surface engaged by said disc to illustrate the function of the holder.

FIG. 2 illustrates three slightly different forms of lens holder. The first holder at the left of the illustration includes an elongated shaft 16 mounting an adhesion disc 14 at one end engaging the convex side of a contact lens L, as for example of 6 mm. diameter. The central illustration is a similar holder in a slightly increased size disc 14 adapted to engage for example, the concave surface of a little bit larger contact lens, the diameter of the disc being 7 mm. for illustration.

The third illustration in FIG. 2 shows an elongated tubular shaft 18, of aluminum for illustration and within the respective ends thereof are projected the unit shanks of the respective discs 14; each of slightly different diameter such as shown in the other two illustrations of FIGS. 1 and 2. This tool, therefore, provides adhesion discs at its opposite ends adapted for holding different sized contact lenses.

FIG. 3 is a longitudinal section of one of the holders shown in FIG. 2 wherein the shaft 16 which serves as the handle has a longitudinal bore 10 throughout and projected into one end thereof is the unit shank 20 which forms an integral par of the disc 14.

Said shank is compressively and snugly projected into bore 10 at one end of said shaft for frictional holding therein. Additionally for increased holding forces there is provided a staple 22 whose one end extends transversely through an end portion of the shank 20 and whose opposite end extends axially rearward of the shank for operative retaining engagement with the internal surface of the shaft 16.

Increased holding pressure is additionally provided if as desired by the use of a suitable adhesive at 24 which may be any type of hot melt glue or plastic adhesive or the like or a resin type adhesive for further fixedly securing the disc 14 at one end of the tool shaft 16. FIG. 3 shows the disc in exploded relation with respect to the convex surface of lens L.

FIG. 4 is an exploded view in side elevation of the present lens holder in exploded relation with respect to the concave surface of lens L.

Under some conditions it is desired to have a more firm grip upon the convex surface of such lens, such as illustrated in the exploded view, FIG. 5.

For this purpose, there is provided between the disc 14 and the convex surface of lens L, an intermediate adapter disc 26 which has upon its opposite surfaces, a suitable pressure sensitive adhesive 28.

Using the tool 42 shown in FIG. 9, the rubber adapter disc 26 is projected onto the adhesion disc 14 and thereafter applied to the convex surface of lens L to provide increased holding force for any operation desired with respect to the lens such as adjusting, polishing the same or making some modification in its radii. This is particularly useful where increased holding power is required as for example, when using a buffing wheel or any other machining operation. The present disc is sandwiched between the lens and the adhesion disc for increased holding pressure, FIG. 6.

One form of double-tape disc storage and dispensing device 30 is shown in FIG. 7 which includes backing plate 32 of aluminum, for illustration, over which is applied the rubberized cloth sheet 34 which has a pressure sensitive adhesive 28 applied to its opposite surfaces for thus adhering the rubberized sheet to the backing plate. Superimposed over the rubberized sheet is a paper cover 36 completing the assembly. Compressed into the cover 36 and the intermediate rubberized sheet 26 are a series of rows of spaced scorings as at 38, which in effect, die-cut the paper cover and the rubberized sheet to provide a series of individual rubberized discs 26 with the overlying paper discs 40.

Employing the needle holder type of tool 42 shown in FIG. 9 which has a projecting pointed pin 44 at one end, the paper disc 40 is first removed manually and from thereunder, there is lifted the double-adhesive rubberized disc 26 such as shown for application to the concave portion of the adhesion disc 14 in the manner illustrated in FIG. 5.

While the adhesion disc assembly and shank as a unit construction has been described as being of soft rubber, it is contemplated as equivalent that a synthetic rubber or a polyethylene or other plastic material could be adapted, provided it has the flexibility characteristic required.

In normal use, in lifting a lens, the adhesion disc 14 is ever so slightly moistened and is merely touched to one surface or the other of the contact lens for firm securing engagement, with the disc 14 snugly conforming in shape to the lens.

The present holder may also be used for the removal of a contact lens from the human eye, if desired.

My new device: to hold contact lenses of any size for any length of time on either side.

The adhesion rod idea is based on the fact, that two identical surfaces contacting each other, having some moisture in between, very hard to separate. Like two pieces of glass with a drop of water in between. The adhesion rod designed for contact lens holding purposes is a small, 6 or 7 mm. diameter rubber disc, slightly concave curved. To get the most adhesion, the disc is made thin, tapered toward the edges, the rubber is pure and the contact surface is smooth, like a mirror. The disc has a stem, which fits the end of a 3-inch metal tube, for illustration.

The adhesive disc holder in a perfect tool to be used on the concave side, but using it on the convex, the following changes are needed: The disc is about 1 mm. smaller to leave the periphery of the lens free to be able to finish the edges properly. Buffing wheel is commonly used to this operation, this would require even a stronger holding power of the tool, but the adhesive disc is even smaller now than before. Using double-face adhesive tape disc between the convex side of the lens and the rubber disc end of the holder prevents the lens to fly away or rotate.

The adhesive disc holders come in two sizes: the larger is about 7 mm. in diameter, to be used as is on the concave side, the smaller about 6 mm. fortified with the double-face adhesive disc to be used on the convex side of the lens.

Thus, it is believed that the present lens holder construction has solved the existing problem of providing a very convenient and inexpensive and simple means for gripping, holding for adjustment and machining or other treatment of the very small size contact lens presently available. The lenses are held safely and properly while adjusting and provides a very convenient mechanism for the handling of this small lens.

The contact lens suction cups have three faults: they are too large for the present small sized lenses; they cannot be used well on the concave side; and it is a tool without handle.

A good lens holding device to hold lenses of any size on any side for any length of time is very important, so a new tool was devised in the present invention. This is a revolutionary departure from the all rubber suctions cups: i.e. the adhesion rods. Based on the fact that two similar surfaces moistened, adhere with a great force, the same way a very smooth pliable rubber disc will stick to any side of a highly polished contact lens on a slight contact. A short stem 20 on one side of this disc 14 goes in a thin rigid tubing 16 about 3 inches long for easy handling of the lens when adjusting.

Presently, the smallest lenses are 7.5—8 mm. in diameter. The disc 14 is only 5—6 mm. The smallest suction cup is 8/mm. unstretched.

Contact lens adjusting is a complex problem, aggravated by the fact that the adhesion of the lens to the disc is perfect only, when the surface of the rubber disc and the lens are free of impurities. (Dirt, dust, mucous, fingerprint, etc.) Also a small sized disc has a smaller holding power. To increase the holding power, to be able to hold the lenses using even a high speed buffing wheel, without the lens getting disengaged, an additional device: the double-tape disc 28 is used, FIG. 5, placed device; the lens and rubber disc. Owing to the fact, that the rubber and tape discs conform with the curvature of the lens surface using a slight pressure, the holding power is maximum and the lens can be safely handled to any operation.

When the lens is attached to the concave side, no double tape is required. We need a fortified holding power—additional tape disc 28, FIG. 6, for the convex side of the lens.

About half of the operations cannot be done without the additional double-tape disc. The double-tape disc is considered an integral part of this new lens holding system, forming one unit.

I claim:

1. A contact lens holder comprising an elongated shaft having a bore;
   a unit flexible concaved adhesion disc mounted on an end of the shaft, including a cylindrical shank snugly and compressively projected into said bore; and
   means securing said shank within said shaft, said securing means including a wire staple, at one end projected transversely through said shank, with its other end extending rearwardly of said shank and frictionally engaging the interior wall of said shaft.

2. In the contact lens holder of claim 1, said securing means including an adhesive material interposed between said bore and shank.

3. A contact lens holder comprising an elongated shaft having a bore;
   a unit flexible concaved adhesion disc mounted on an end of the shaft, including a cylindrical shank snugly and compressively projected into said bore;
   means securing said shank within said shaft, and
   an adapter disc of flexible material with pressure sensitive adhesive on its opposite sides, nested upon the concave surface of the adhesion disc, adapted for increased retaining engagement with the convex side of a contact lens.